United States Patent
Sweet

(10) Patent No.: US 10,387,979 B2
(45) Date of Patent: Aug. 20, 2019

(54) AUTOMATIC VEHICLE AND DRIVER IDENTIFICATION SYSTEM

(71) Applicant: Panasonic Automotive Systems Company of America, Division of Panasonic Corporation of North America, Peachtree City, GA (US)

(72) Inventor: Benjamin David Sweet, West Bloomfield, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/667,044

(22) Filed: Aug. 2, 2017

(65) Prior Publication Data

US 2018/0047122 A1    Feb. 15, 2018

Related U.S. Application Data

(60) Provisional application No. 62/372,390, filed on Aug. 9, 2016.

(51) Int. Cl.
| | |
|---|---|
| *H04B 7/26* | (2006.01) |
| *G06Q 50/26* | (2012.01) |
| *G06Q 30/00* | (2012.01) |
| *G06K 9/20* | (2006.01) |
| *G06K 7/14* | (2006.01) |

(52) U.S. Cl.
CPC ............ *G06Q 50/26* (2013.01); *G06Q 30/018* (2013.01); *H04B 7/26* (2013.01); *G06K 7/1413* (2013.01); *G06K 7/1417* (2013.01); *G06K 9/209* (2013.01)

(58) Field of Classification Search
CPC .... G06Q 50/26; G06Q 50/265; G06Q 30/018; G06Q 10/10; G06Q 40/08; H04B 7/24; H04B 7/26; G08G 1/017
See application file for complete search history.

(56) References Cited

U.S. PATENT DOCUMENTS

| | | | |
|---|---|---|---|
| 2004/0046646 A1* | 3/2004 | Eskridge | G08G 1/017 340/425.5 |
| 2015/0193779 A1* | 7/2015 | Lima | G06Q 30/018 705/317 |
| 2015/0310451 A1* | 10/2015 | Plagens | G06Q 30/018 705/317 |
| 2017/0032485 A1* | 2/2017 | Vemury | G06Q 50/265 |

* cited by examiner

*Primary Examiner* — Thanh C Le
(74) *Attorney, Agent, or Firm* — Laurence S. Roach, Esq.

(57) ABSTRACT

A motor vehicle includes an automatic driver and vehicle information reporting arrangement. The arrangement includes a memory device storing information about a human driver of the motor vehicle and registration information associated with the motor vehicle. An electronic processor is communicatively coupled to the memory device and responds to a prompt by transmitting a signal indicative of the information about the human driver of the motor vehicle and about registration information associated with the motor vehicle.

19 Claims, 3 Drawing Sheets

AUTOMATIC VEHICLE AND DRIVER IDENTIFICATION SYSTEM

CROSS-REFERENCE TO RELATED APPLICATION

This application claims benefit of U.S. Provisional Application No. 62/372,390 filed on Aug. 9, 2016, which the disclosure of which is hereby incorporated by reference in its entirety for all purposes.

FIELD OF THE INVENTION

The disclosure relates to an electronic system for providing identification for a driver and for a motor vehicle.

BACKGROUND OF THE INVENTION

Police officers approaching a vehicle at a traffic stop may perceive a threat when the driver reaches for the requested documentation (e.g., driver's license, vehicle registration, and proof of vehicle insurance). In almost all cases, the driver needs to reach for the documents, which may typically be stored in, for example, the driver's wallet, pocket, purse, glovebox or other vehicle compartment. The need to reach for or otherwise retrieve the documents may obscure the driver's hands from the police officer, after which the driver may either produce the requested documentation, or, in some tragic cases, a weapon. This situation may place the police officer under stress due to the potential threat from the driver's hands reaching into obscured spaces, and also puts the driver under stress as the police officer, who is also under stress, is armed.

In short, the current manual method of producing hard copies of documentation poses a potential problem by requiring the driver to reach for hard-copies of the requested documentation. There are no known electronic systems that perform this functionality of providing the requested documentation.

SUMMARY

During a traffic stop, the automatic identification system of the present invention may enable the police officer to retrieve the necessary information about the driver and the vehicle without the need for the driver to reach into obscured spaces. Before or during the traffic stop, the driver of a vehicle may be enabled to present their valid driver's license which is read and/or input by the automatic identification system of the present invention.

In one embodiment, the invention comprises a motor vehicle including an automatic driver and vehicle information reporting arrangement. The arrangement includes a memory device that stores information about a human driver of the motor vehicle and registration information associated with that motor vehicle. An electronic processor is communicatively coupled to the memory device and responds to a prompt by transmitting a signal indicative of the stored information about the human driver of the motor vehicle and about the registration information associated with the motor vehicle. An automatic identification reader may access the transmitted signal embodying the information about the driver and the vehicle. More particularly, in the event of a traffic stop, police officers (and others officials with proper authorization and the associated necessary equipment) can receive, access and read the necessary information about the driver and the vehicle directly from the signal transmitted by the automatic identification system in, for example, digital format without the driver needing to present any hardcopy documents. The storage of such information in the automatic identification system may be secure, and appropriate credentials and equipment may be required in order to read the information about the driver and the vehicle.

The driver's license may be read by optical scan, barcode, QR code, magnetic tape, embedded chip, etc. This and other information necessary for legal vehicle operation, such as vehicle registration, proof of vehicle insurance, etc., may also be loaded into and secured by the automatic identification system, and then provided to an authorized recipient.

In one embodiment, the driver's license information of several different drivers may be preloaded into the system, and the driver may select their information from memory to transmit to the authorized official. Alternatively, the vehicle may identify the driver by any known method (such as optical recognition of the driver) and select the driver's license information from memory to transmit to the authorized official.

Various methods may be employed within the scope of the invention to read, store and transmit the driver's license information. For example, text on the license may be input by optical character recognition. The driver's photograph on the driver's license may be optically scanned into the system. If the driver's license includes a bar code and/or QR code, then that code may be scanned. If the driver's license includes a magnetic tape, then data may be read from the tape. If the driver's license includes an embedded chip or integrated circuit, then data may be read from the chip or IC. A driver's data and vehicle data may be stored in remote memory not physically disposed within the vehicle such as "Cloud" storage or memory within the driver's handheld device; this remote memory may also be secure memory storage.

Various methods may be employed within the scope of the invention for the associated automatic identification reader to access the information about the driver and the vehicle. For example, the reader may access the information physically with a cable. The reader may also access the information via short-range wireless communication, such as via Blue Tooth, Zigbee, WiFi, etc. The reader may also access the information via other wireless communication technology, such as cellular or DSRC (Dedicated Short-Range Communications—vehicle-to-infrastructure (V2I, V2X)).

An in-vehicle warning indicator (similar to "unfastened seat belt" indicator) may indicate to the driver when the driver's license has not been entered into the reader/scanner. This indicator may remind or notify the driver in the event that they have forgotten their driver's license. However, the lack of a driver's license may not prevent the vehicle from starting, as the vehicle may need to be operated in emergency situations.

In another embodiment, the invention comprises a method of operating a motor vehicle, including storing within the motor vehicle information about a human driver of the motor vehicle and about registration information associated with the motor vehicle. A prompt is responded to by transmitting from the motor vehicle to an entity outside the motor vehicle a signal indicative of the information about the human driver of the motor vehicle and about registration information associated with the motor vehicle.

In yet another embodiment, the invention comprises a motor vehicle infotainment system including an input device extracting from a driver's license information about a human driver of the motor vehicle. A memory device disposed within the infotainment system stores the information about the human driver of the motor vehicle and information about registration of the motor vehicle. An electronic processor of the infotainment system is communicatively coupled to the input device and to the memory device. The electronic processor responds to a prompt by transmitting or otherwise providing a first signal indicative of the information about the human driver of the motor vehicle and about registration information associated with the motor vehicle. A transmitter is communicatively coupled to the electronic processor and receives the first signal and wirelessly transmits a second signal based on the first signal.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
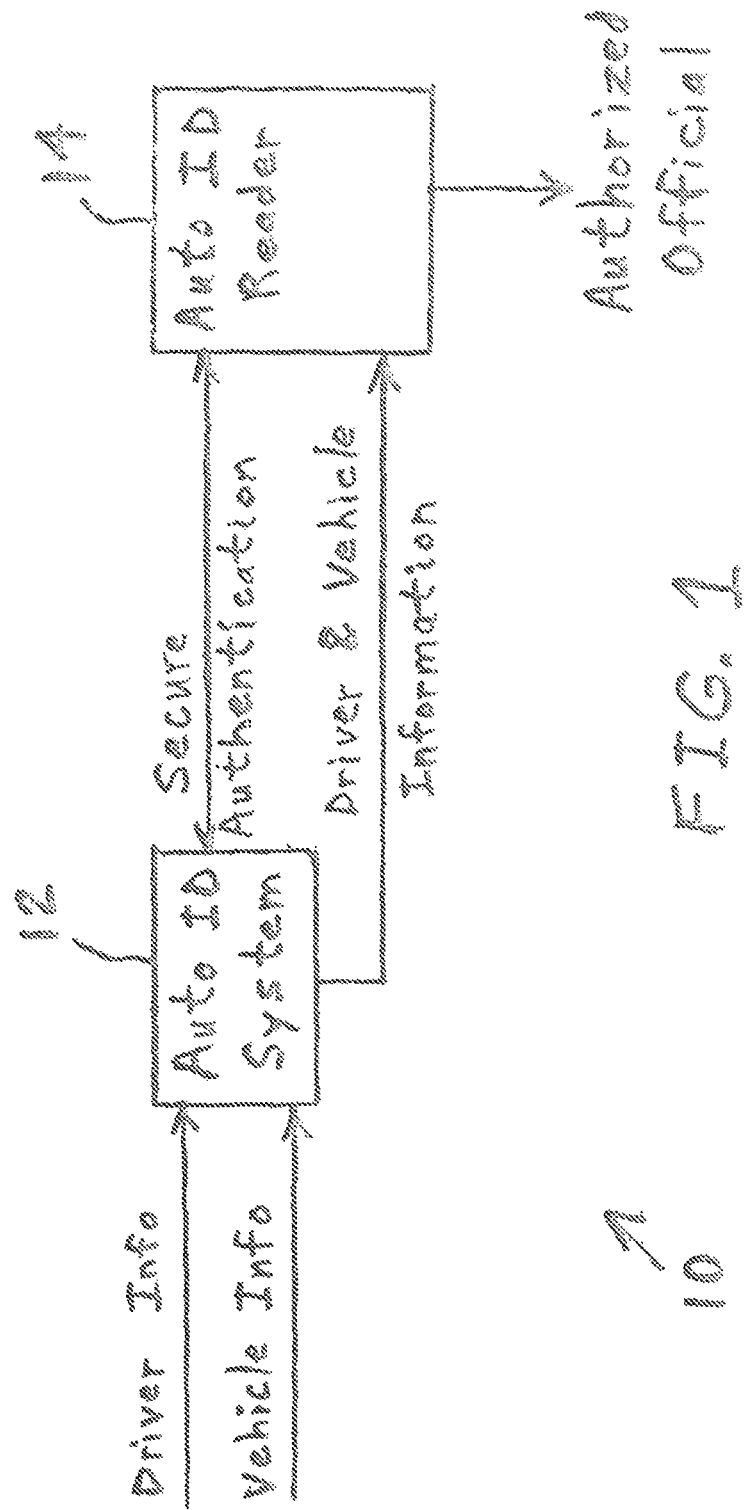
FIG. 1 is a block diagram of one embodiment of an automatic motor vehicle and driver identification arrangement of the present invention.

FIG. 1 illustrates one embodiment of an automatic motor vehicle and driver identification arrangement 10 of the present invention, including an in-vehicle automatic identification system 12 and an automatic identification reader 14. Automatic identification system 12 may electronically receive and store driver information, such as the information that is on the state-issued driver's license of one or more drivers. Automatic identification system 12 may also electronically receive and store vehicle information, such as the information that is on the vehicle registration document (e.g., vehicle identification number) and proof of insurance document. Automatic identification system 12 may include a reader device, a memory device, a transceiver, and an electronic processor which is connected to the reader device, the memory device and to the transceiver. Automatic identification system 12 may extract information from the driver's license and/or vehicle registration documents.

Automatic identification reader 14 may include a transceiver, a display screen, a loudspeaker, and an electronic processor which is connected to the transceiver, the display screen, and the loudspeaker. In one embodiment, the system may utilize an existing display screen in the police (or other authorized) vehicle, such as the display screen of an infotainment unit.

At the beginning of a traffic stop or vehicle border crossing, the authorized official (e.g., police officer or border crossing guard) may cause a secure authorization signal to be transmitted from reader 14 to identification system 12 in the vehicle. This authorization signal may inform identification system 12 that an authorized entity is requesting the driver and vehicle information that is stored in system 12. System 12 may reply to the authorization signal from reader 14 by transmitting a second authorization signal to reader 14. This second authorization signal may inform reader 14 that system 12 recognizes that reader 14 has proper authorization, and that system 12 will be transmitting the requested driver and vehicle information. Conversely, the second authorization signal may inform reader 14 that system 12 does not recognize that reader 14 has proper authorization, and that system 12 will not be transmitting the requested driver and vehicle information. Reader 14 may then indicate to the authorized official that system 12 has not recognized reader 14 as being authorized, and so the authorized official may approach the driver to request hard copies of the driver and vehicle information, as in the prior art.

If reader 14 does receive the driver and vehicle information from system 12, then reader 14 may present the information to the authorized official, such as in text form on a display screen of reader 14, or audibly over a loudspeaker of reader 14.

Figure 2:
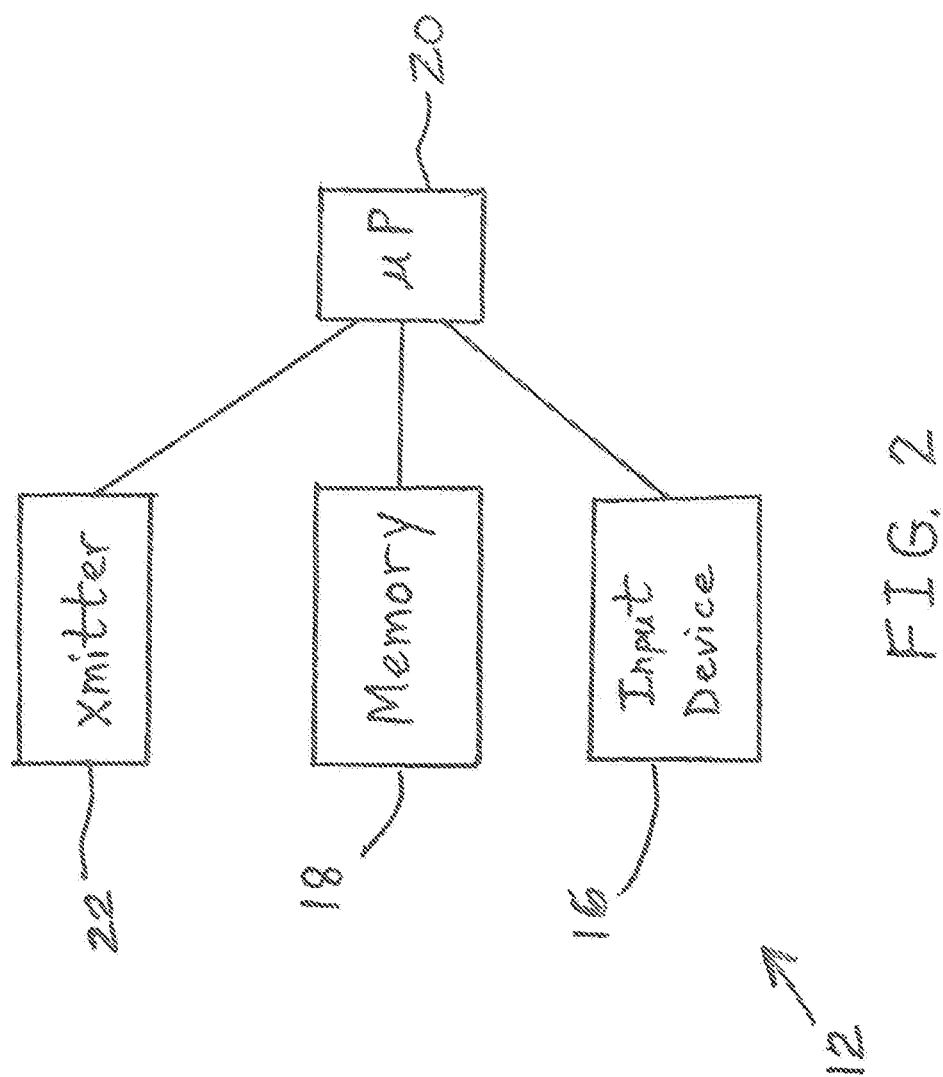
FIG. 2 is a block diagram of the automatic identification system of FIG. 1.

FIG. 2 illustrates a block diagram of the automatic identification system 12 which may include an input device 16, such as an optical reader/scanner or magnetic tape reader, for example, for extracting from a driver's license information about a human driver of the motor vehicle. A memory device 18 may store the information about the human driver of the motor vehicle and information about registration of the motor vehicle. Memory device 18 may be a memory storage device physically located within the motor vehicle, as shown. In alternative embodiments, however, the memory device may be communicatively coupled remote memory such as Cloud storage or memory within a driver's handheld device.

An electronic processor 20 may be communicatively coupled to input device 16 and to memory device 18. Electronic processor 20 may respond to a prompt by transmitting a first signal indicative of the information about the human driver of the motor vehicle and about registration information associated with the motor vehicle. A transmitter 22 may be communicatively coupled to electronic processor 20. Transmitter 22 may receive the first signal and wirelessly transmit a second signal based on the first signal.

Figure 3:
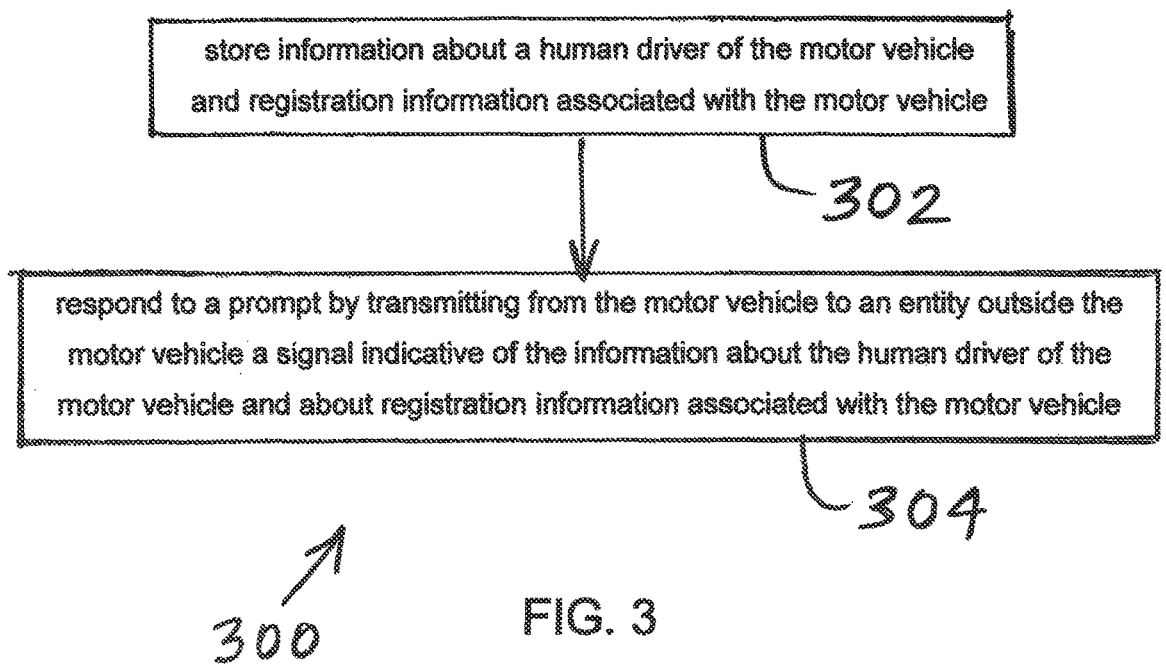
FIG. 3 is a flow chart of one embodiment of a method of the present invention for operating a motor vehicle.

FIG. 3 illustrates one embodiment of a method 300 of the present invention for operating a motor vehicle. In a first step 302, information about a human driver of the motor vehicle and registration information associated with the motor vehicle are stored. For example, an in-vehicle automatic identification system 12 may electronically receive and store driver information, such as the information that is on the state-issued driver's license of one or more drivers. Automatic identification system 12 may also electronically receive and store vehicle information, such as the information that is on the vehicle registration document (e.g., vehicle identification number) and proof of insurance document. Alternatively, the information about the human driver of the motor vehicle and/or the registration information associated with the motor vehicle may be stored remotely, such as in the Cloud, or in a personal electronic device of the driver, for example.

In a final step 304, a prompt is responded to by transmitting from the motor vehicle to an entity outside the motor vehicle a signal indicative of the information about the human driver of the motor vehicle and about registration information associated with the motor vehicle. For example, electronic processor 20 may respond to a prompt by transmitting a first signal indicative of the information about the human driver of the motor vehicle and about registration information associated with the motor vehicle. Transmitter 22 may receive the first signal and wirelessly transmit a second signal based on the first signal to automatic identification reader 14.

The foregoing description may refer to "motor vehicle", "automobile", "automotive", or similar expressions. It is to be understood that these terms are not intended to limit the invention to any particular type of transportation vehicle.

Rather, the invention may be applied to any type of transportation vehicle whether traveling by air, water, or wound, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. An automatic driver and vehicle information reporting arrangement in a motor vehicle, the arrangement comprising:
   an input device configured to extract information from a vehicle registration document associated with the motor vehicle and extract information about a human driver of the motor vehicle from a driver's license;
   a memory device configured to store the information about a human driver of the motor vehicle and the information extracted from the vehicle registration document associated with the motor vehicle; and
   an electronic processor communicatively coupled to the memory device and configured to respond to a prompt by transmitting a signal including the information about the human driver of the motor vehicle and including the information extracted from the vehicle registration document associated with the motor vehicle.

2. The arrangement of claim 1 wherein the input device comprises an optical character recognition device and an optical scanner configured to optically scan a driver's photograph on the driver's license.

3. The arrangement of claim 1 wherein the input device comprises a bar code scanner and/or a QR code scanner configured to optically scan a bar code and/or a QR code on a driver's license.

4. The arrangement of claim 1 wherein the input device comprises a magnetic tape reader configured to read a magnetic tape on a driver's license.

5. The arrangement of claim 1 wherein the input device comprises an integrated circuit reader configured to read an embedded chip or an integrated circuit on a driver's license.

6. A method of operating a motor vehicle, the method comprising:
   providing an input device within the motor vehicle;
   using the input device to extract information from a vehicle registration document associated with the motor vehicle;
   using the input device to extract the information about a human driver of the motor vehicle from a driver's license;
   storing the information about the human driver of the motor vehicle and registration information associated with the motor vehicle; and
   responding to a prompt by transmitting from the motor vehicle to an entity outside the motor vehicle a signal indicative of the information about the human driver of the motor vehicle and the information extracted from the vehicle registration document associated with the motor vehicle.

7. The method of claim 6 wherein the input device comprises one of:
   an optical character recognition device;
   an optical scanner that optically scans a driver's photograph on the driver's license;
   a bar code scanner and/or a QR code scanner that optically scans a bar code and/or a QR code on a driver's license;
   a magnetic tape reader that reads a magnetic tape on a driver's license; and
   an integrated circuit reader that reads an embedded chip or an integrated circuit on a driver's license.

8. The method of claim 6 wherein the transmitting comprises using a short-range wireless communication transmitter, the transmitter comprising a Blue Tooth transmitter, a Zigbee transmitter, or a WiFi transmitter.

9. The method of claim 6 wherein the transmitting comprises using a wireless communication transmitter, the transmitter comprising a cellular transmitter or a DSRC (Dedicated Short-Range Communications—vehicle-to-vehicle or vehicle-to-infrastructure) transmitter.

10. The method of claim 6 wherein the prompt comprises a wireless signal received within the motor vehicle from a police officer or border crossing guard.

11. The method of claim 6 wherein the prompt is received from the driver of the motor vehicle.

12. A motor vehicle infotainment system comprising:
    an input device configured to extract from a driver's license information about a human driver of the motor vehicle;
    an electronic processor communicatively coupled to the input device and to a memory device, the memory device storing the information about the human driver of the motor vehicle and information about registration of the motor vehicle, the electronic processor being configured to respond to a prompt by transmitting a first signal indicative of the information about the human driver of the motor vehicle and about registration information associated with the motor vehicle; and
    a transmitter communicatively coupled to the electronic processor and configured to receive the first signal and wirelessly transmit a second signal based on the first signal.

13. The infotainment system of claim 12 wherein the prompt comprises a wireless signal received within the motor vehicle from an authorized officer, the system further comprising a receiver configured to receive the wireless signal from the authorized officer.

14. The infotainment system of claim 12 wherein the input device comprises an optical character recognition device.

15. The infotainment system of claim 12 wherein the input device comprises an optical scanner configured to optically scan a driver's photograph on the driver's license.

16. The infotainment system of claim 12 wherein the input device comprises a bar code scanner and/or a QR code scanner configured to optically scan a bar code and/or a QR code on a driver's license.

17. The infotainment system of claim 12 wherein the input device comprises a magnetic tape reader configured to read a magnetic tape on a driver's license.

18. The infotainment system of claim 12 herein the input device comprises an integrated circuit reader configured to read an embedded chip or an integrated circuit on a driver's license.

19. The infotainment system of claim 12 wherein the memory device stores information from a vehicle registration document, the information from the vehicle registration document including a vehicle identification number, the electronic processor being configured to respond to a prompt by transmitting a first signal including the information about the human driver of the motor vehicle and including the information from the vehicle registration document, including the vehicle identification number, an identity of a manufacturer of the motor vehicle, a date of the vehicle registration document, and a name of an owner of the motor vehicle.

\* \* \* \* \*